United States Patent [19]

Harmon

[11] Patent Number: 5,052,555
[45] Date of Patent: Oct. 1, 1991

[54] TOTE BAG FOR FLY-TYING EQUIPMENT AND MATERIALS

[76] Inventor: Steven L. Harmon, 5825 Dover St., Oakland, Calif. 94609

[21] Appl. No.: 556,654

[22] Filed: Jul. 20, 1990

[51] Int. Cl.$^5$ .................. A01K 97/00; B65D 85/00; A45G 3/00
[52] U.S. Cl. .................. 206/315.11; 190/111; 383/37; 43/57.1
[58] Field of Search .................. 43/57.1; 206/315.11; 190/111; 383/37

[56] References Cited

U.S. PATENT DOCUMENTS

| | | | |
|---|---|---|---|
| 2,011,709 | 8/1935 | Craighead | 206/315.11 |
| 2,065,234 | 12/1936 | Martinez | 206/315.11 X |
| 2,540,340 | 2/1951 | Linblade | 206/315.11 X |
| 2,691,400 | 10/1954 | Giordano | 206/315.11 X |
| 4,301,898 | 11/1981 | Plough et al. | 206/315.11 |
| 4,418,806 | 12/1983 | Johnson | 190/111 |
| 4,691,469 | 9/1987 | Alsobrook et al. | 383/37 X |
| 4,693,344 | 9/1987 | Shuler | 190/111 X |
| 4,753,329 | 6/1988 | Choy | 190/111 |
| 4,821,853 | 4/1989 | Young | 190/111 |
| 4,830,154 | 5/1989 | Gerch et al. | 190/111 X |
| 4,892,241 | 1/1990 | Mavrakis | 206/315.11 |
| 4,966,279 | 10/1990 | Pearcy | 206/315.11 |

*Primary Examiner*—William I. Price
*Attorney, Agent, or Firm*—John J. Leavitt

[57] ABSTRACT

Presented is a soft-pack tote bag for carrying flytying materials, tools and equipment. The tote bag constitutes a main receptacle having handles for ease in carrying, and within contains three additional auxiliary receptacles used for storing materials such as feathers in a first one of the auxiliary receptacles, tools of various kinds in a second auxiliary receptacle and a fly-tying vise with associated accessories in a third auxiliary receptacle. Additionally, a detachable dubbing panel is provided that serves to store a variety of dubbing furs and miscellaneous materials in a compartmentalized fashion.

20 Claims, 5 Drawing Sheets

FIG_4

FIG_5

FIG. 6

TOTE BAG FOR FLY-TYING EQUIPMENT AND MATERIALS

BACKGROUND OF THE INVENTION

Among the many people who love to fish, perhaps the most dedicated to their sport are those who love to fly-fish. The art of successful fly-fishing, and it is an art, incorporates many different factors, including the skill of the fisherman, the type of equipment used, the stream fished, the weather, and certainly the type of "fly" being cast over the water to attract a fish to strike. With regard to the type of "fly" to use in any given situation, it is a choice only the fisherman can make when he arrives at the location where he is going to fish. Obviously, with experience and repeated visits to the same location, experience will aid in the selection of the type of "fly" to use.

One of the disadvantages faced by many fly-fishermen is that most fly-fishing requires fast running water in unpolluted streams, and these are usually found only at great distances from the centers of population. It thus requires that the fly-fisherman travel a great distance to enjoy the sport. This raises the specter that he might not have the proper fly for the particular stream, or sources for different types of flies may not be convenient, or the materials for the type of fly needed in any given situation may not be available. The subject matter of this invention is in part a response to the more widespread travel undertaken by the average fisherman and the increased popularity of fly-fishing in general. Because of these developments, the traditional or conventional storage devices for fly-tying tools and fly-tying materials are largely inadequate.

Heretofore, most travel or storage systems used by fly-fishermen were of two types: 1) the hard-case fly-tying box (or an adapted hard-case fishing tackle box of conventional design), and 2) the small streamside portable fly-tying kit.

The hard-case fly tying box utilizes a system of drawers with individually divided sections and a larger top-loading drawer for miscellaneous storage. Sometimes these cases are made of wood, but most recently, these hard-case fly-tying boxes are formed from hard plastic. This system has inherent drawbacks: materials and tools are not equally and easily visible and available at all times; the hard-case drawers and compartments are not always suitable to a fly-tyer's needs; and the overall bulk and size of the device makes it inappropriate for most travel applications. Included within this category of devices is the fly-tyer's hard-case briefcase. Yet, it too, has shortcomings. Most utilize a system of elastic loops for displaying and retaining tools; however, elastic deteriorates and stretches in time and this system provides little protection or security for the tools themselves. Furthermore, the briefcase typically provides little or no compartmentalization for materials or tools. The major disadvantage, however, is the bulk and size of this type of container.

An alternative to the bulky types of fly-tying bags and/or boxes discussed above is the so-called "streamside" tying kits which provide less bulk, but are disadvantageous in other ways. While they are small and very portable, they are inappropriate for extensive fly-tying. They typically contain their own abbreviated set of tying tools with little or no storage capacity for tying materials. They usually will not accommodate the serious fly-tying fisherman on an extended fishing trip or the traveling professional fly-tyer.

Recently there have been some commercial attempts at soft-pack tying cases. These have generally been binder-type arrangements comprised of a few loose-leaf polyethelene zip-lock bags together with a few general-purpose slip or patch pockets sewn onto the front and back of the soft-pack binder. These are inadequate in that they lack carrying capacity and are not organized from a functional point of view. To my knowledge, none of these devices has been patented. The so-called "Lake Creek" fly-tying cases are similar in concept, but not in structure, to my invention as described and illustrated herein. Yet, while they contain their own "knee bench", they do not provide adequate storage capacity and compartmentalization for the serious fly-tying fisherman.

A preliminary patentability and novelty search conducted in connection with the subject matter of my invention revealed the existence of U.S. Pat. No(s). 2,011,709; 2,065,234; 2,540,340; 2,691,400 and 4,691,469. An examination of the first three patents listed above will reveal that each relates to a container for carrying completed flies. None of these devices relates in any way to a container for organizing the materials and the tools with which flies are made. Additionally, none of the structures depicted in these first three patents has any structural correspondence to the subject matter of my invention.

U.S. Pat. No. 2,691,400 relates to a fisherman's utility bag which may be put to many different uses. While it may be used to carry fly-tying tools and materials, as any duffel bag may, its intended design is for carrying fishing tackle in completed form. Furthermore, there is considerable structural difference between this patented structure and my invention.

U.S. Pat. No. 4,691,469 relates to a fishing tackle management system designed specifically to hold fishing tackle rather than tools and materials for constructing flies. Again, its structure and organization is substantially different from my invention.

Fly-tying is undergoing a creative revolution at the present time resulting from several factors. Among these is the availability of many new synthetic materials which has encouraged greater experimentation with techniques, tools, and materials. The modern fly-tying fisherman now carries many new materials and tools that have not previously existed. Increased knowledge about the feeding habits of fish and the life-cycles of aquatic insects has furthermore induced a demand for more exacting imitations from the fly-tyer. These factors, among others, are making fly-tying very specialized, and are in turn creating a demand for a more adequate portable organizational system such as my tote.

Accordingly, one of the important objects of my invention is the provision of a compact soft-pack tote bag for carrying fly-tying tools and materials in an organized and easily accessible manner.

Another important object of my invention is the provision of a tote bag for fly-tying tools and materials that is appropriate for travel, yet large enough to accommodate the many different types of materials and tools used by a serious fly-tying fisherman.

A still further object of the invention is the provision of a tote bag for fly-tying equipment and materials that presents a well-organized system that provides equal visibility and equal access to all the tools and materials.

Most bags used for the purpose of my invention merely provide a void within the bag into which tools and materials may be deposited and from which they must be extricated with difficulty. Accordingly it is yet another object of my invention to provide a tote bag for fly-tying equipment and materials in which the bag provides and dictates a system for storing tools, equipment and materials so that they may be retrieved for use in a quick and efficient manner.

It is anticipated that every fly-tying fisherman will have his own method of organization, and it is therefore another object of the invention to provide a tote bag for fly-tying tools, equipment and materials that is specific enough to be functionally efficient, while being generic enough to be flexible and adaptable to the individual needs of any given fly-tyer.

Some of the tools and equipment utilized to tie flies are durable hard goods that can cause damage to other tools or materials with which they might impact during transport. Accordingly, it is another object of the invention to provide a tote bag for such fly-tying tools and equipment that will not only hold such tools and equipment secure, but will provide protection for said tools and materials during storage and transport.

The invention possesses other objects and features of value, some of which, with the foregoing, will be apparent from the following description and the drawings. It is to be understood, however, that the invention is not limited to the embodiment illustrated and described since it may be embodied in various forms within the scope of the appended claims.

SUMMARY OF THE INVENTION

In terms of broad inclusion, the subject matter of my invention comprises a soft-pack tote bag or soft carrying case for organizing and carrying the tools, materials and equipment that are used in the construction of artificial flies utilized in fly-fishing. In general, the tote bag includes three main sections, each designed for specific uses and each containing design features appropriate to these uses. The tote bag also includes a separate receptacle or pocket for a vise, as well as extra storage compartments for retaining the materials from which fishing flies are constructed. The sections or components forming the tote bag are conveniently identified as the tool section or receptacle, the "cape" section or receptacle, and the dubbing section, the latter being a fold-up, detachable section or panel that folds into the main body of the tote bag. When the dubbing panel is folded into the tote bag, the tool section and "cape" section are closed using a perimeter-zipper panel. The exterior of the tote bag is provided with two handles to facilitate portability.

BRIEF DESCRIPTION OF THE DRAWINGS

FIG. 6 is a top-plan view of the entire tote bag shown in open condition to reveal some of the various compartments of the bag.

DESCRIPTION OF THE PREFERRED EMBODIMENT

Figure 1:
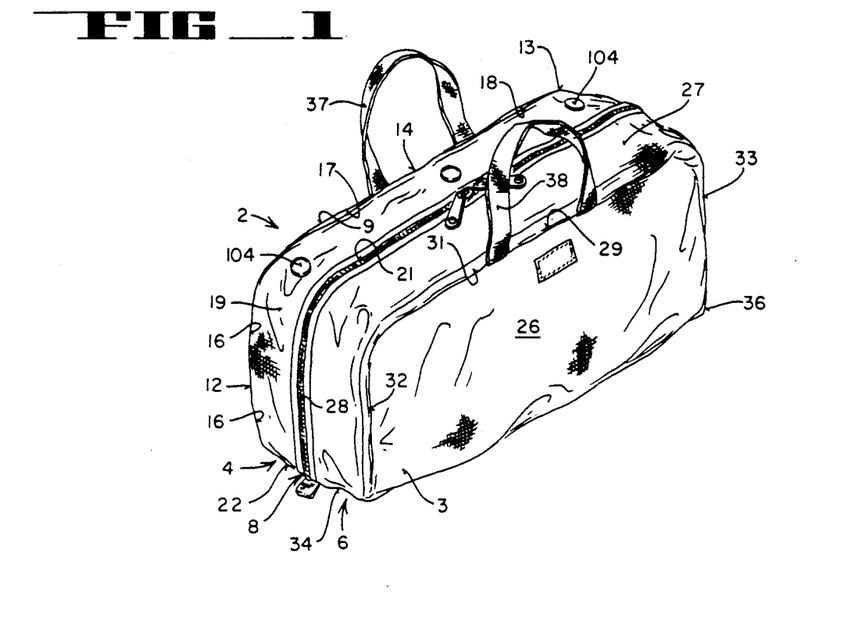
FIG. 1 is a perspective view of my tote bag for fly-tying equipment, tools and materials shown in its closed condition for portability.

In terms of greater detail, the portable, soft-pack tote bag of my invention for use in connection with fly-tying tools, equipment and materials by fly-tying fishermen, comprises a generally elongated carrying case shown in FIG. 1 in its closed condition for portability, and designated generally by the numeral 2. The material from which the outer covering 3 of the tote bag is formed is preferably a soft but strong and flexible woven fabric sold under the trademark "Cordura" by E. I. DuPont de Nemours.

The tote bag includes two main receptacle portions designated generally by the numerals 4 and 6, the two portions being connected together by a spine 7. The main receptacle portion 4 is seen at the left in FIG. 1, while the main receptacle portion 6 is seen on the right in FIG. 1. The two main receptacle portions when in closed condition, as shown in FIG. 1, are detachably connected over a major portion of their mutually-facing perimeters by a double-zipper structure designated generally by the numeral 8. The main receptacle portion 4 is formed by a flat, generally rectangular flexible fabric side wall member 9, the opposite end edge portions 12 and 13 of which, and one long edge portion 14 of which, are sewn to the associated edges 16, 17 and 18, respectively, of an elongated strip 19 that forms a side-edge wall portion for the main receptacle 4.

The opposite long edge of the elongated side edge wall strip 19 is sewn to one part 21 of the zipper structure 8. The opposite end portions of the elongated strip 19, which is about 2" wide between its long edges and about 24" long, are sewn to the associated opposite end edge portions 22 of the spine 7 which is formed from a generally rectangular, flat woven fabric member 23. One of the long edges 24 of the spine 7, which forms the outside bottom surface of the tote bag, is sewn to the associated long edge portion of the side wall member 9 opposite the long edge portion 14. The double-zipper structure 8 extends the full length of the side edge wall strip member 19, terminating at, and being sewn to, the end edge portions of the bottom wall member 23 generally midway between its side edges. The bottom wall member 23 forms the spine 7, with opposite long edges of the bottom wall member 23 being sewn to the main receptacle portions 4 and 6 as shown. It should be noted that the seams that join the side wall member to the edge wall strip member 19 are internal seams, so that when the strip 19 is sewn to the associated edges of the side wall member, the strip 19 forms the side edge wall as it were of a shallow main receptacle of which the side member 9 is the "bottom", and one half of the spine member 7 completes the "side" of the receptacle opposite the strip 19.

In like manner, the other main receptacle portion 6 of the tote bag is formed by the generally rectangular flexible woven fabric side member 26, the elongated, generally rectangular side edge wall strip 27, and the other half 28 of the double zipper 8, as seen in FIG. 1. As there shown, one long edge portion 29 of the side member 26 is sewn to the associated long edge portion 31 of the elongated strip 27, the edge portion of which is also sewn to the end edge portions 32 and 33 of the side-wall member. As with the elongated strip 19, the opposite end edge portions 34 and 36 of the elongated strip 27 are sewn to the end edge portions of the spine member 7 in juxtaposed relation to opposite end portions of the strip 19 so that the strip 27 complements the strip 19, the two associated edges of the strips on which the zipper portions are sewn being in operative juxtaposition for their entire length when the tote bag is in closed condition as viewed in FIG. 1. The bottom edge portion of the side member 26 is sewn to the associated long edge of the spine member 7. As with the left main receptacle portion 4, the seams of this right main receptacle portion 6 are all internal seams, and there is thus formed upon assembly a second receptacle made up of the side wall member 26, the elongated edge wall strip 27, and one half of the spine member 7. Thus, in effect, there is formed two complementary main receptacle portions permanently joined along corresponding and associated sides by the flexible spine member 7, which forms one side member of each receptacle portion, and selectively joined by the zipper 8 along the remaining three corresponding sides and end edges. When selectively closed by operation of the zipper 8 to detachably join the elongated strips 19 and 27 to form the zipper panel, there is formed a hollow main receptacle or tote bag having two sides 9 and 26, the zipper panel (19, 27) and the bottom wall member or panel 23. To the seam joining the side panels to the zipper panel are attached a pair of handles 37 and 38 by which the tote bag may conveniently be carried.

Within the tote bag thus formed, there is additional structure which will now be described in detail. In the interest of brevity in this description, and to facilitate identification of the various operative components of the combination that forms the tote bag, there is contained within the main receptacle formed by the left main receptacle portion 4 a "cape" or first auxiliary receptacle or compartment designated generally by the numeral 41, a center or third auxiliary vise receptacle or pocket designated by the numeral 42 and overlying the spine 7 formed by the bottom wall member 23, and a second auxiliary or "tool" receptacle designated generally by the numeral 43 and contained within the right main receptacle portion 6 of the tote bag as shown. The first and second auxiliary receptacles lie on opposite sides of the third auxiliary or vise receptacle. In addition, there is provided a "dubbing" panel designated generally by the numeral 44 and adapted to be detachably secured to the zipper panel portion 19 as will hereinafter be described in greater detail. The dubbing panel overlies the "cape" or first auxiliary receptacle or pocket when attached, and folds medianly to form a cushion between the first auxiliary receptacle and the second auxiliary or "tool" receptacle when the tote bag is closed as illustrated in FIG. 1.

Referring first to the "cape" or first auxiliary receptacle 41 as seen in FIGS. 3A, 4, 5 and 6, this auxiliary receptacle is formed as a shallow recess by a woven fabric side edge wall 46, one edge portion 47 of which is sewn with and forms a part of the internal seam that joins the side member 9 and the zipper panel portion 19 on three sides and the internal seam that joins the bottom-wall member 23 (spine 7) with the edge portion of the side-wall member 9 opposite the edge portion 14. A top wall 48 of generally rectangular configuration and also formed from a soft and flexible woven fabric is sewn along one of its long-edge portions 49, and to about midway of its two opposite end-edge portions 51 and 52, to the associated exposed edge portions of the side-edge wall 46 as shown. The remaining opposite end-edge portions 53 and 54 of the top wall 48 not sewn to the associated edge portions of the side-edge wall 46, and the long-edge portion 56 of the top wall intercepted by the remaining opposite end-edge portions 53 and 54, are detachably joined to the remaining associated edge portions of the side-edge wall 46 by a zipper 57 that extends well around the associated corners of the side-edge wall 46 and the top wall 48 in a wrap-around pattern.

Sewn to the exposed surface of the top wall 48 of the first auxiliary or "cape" receptacle 41 are two overlapped layers 58 and 59 of a woven fabric, the two layers being offset laterally as shown in FIG. 6, and sewn by stitching 61 to the underlying top wall 48 in such a manner as to form two rows 62 and 63 of four pockets each, with the open ends 64 of the two sets of pockets opening toward the zipper 57 as shown. The rows of stitching 61 spaced along the length of the two layers isolate the pockets one from another so that each may contain appropriate tools or materials without interference with the remaining pockets. It should be noted that the open ends of the pockets face the zipper so that when the tote bag is closed, the open ends of the pockets face upwardly when the tote bag is carried upright by its handles in the orientation illustrated in FIG. 1.

An important aspect of the construction of my tote bag is the fact that the first auxiliary or "cape" receptacle may be fully exposed to provide access to the interior of the "cape" receptacle through the zipper 57 in the edge wall. This is accomplished by folding the side-edge wall 19 downwardly as shown in FIGS. 3A, 4, 5 and 6 so that the side edge wall 19 forms a relatively stiff skirt-like support for the "cape" receptacle, which now lies vaulted upwardly in the nature of a "plateau" raised above the surrounding side edge wall 19 and the adjacent central third auxiliary or vise receptacle 42. Another way of expressing the vaulted condition is to say that the side edge wall 19 is turned inside-out as shown.

Figures 3A, 3B, 3C:
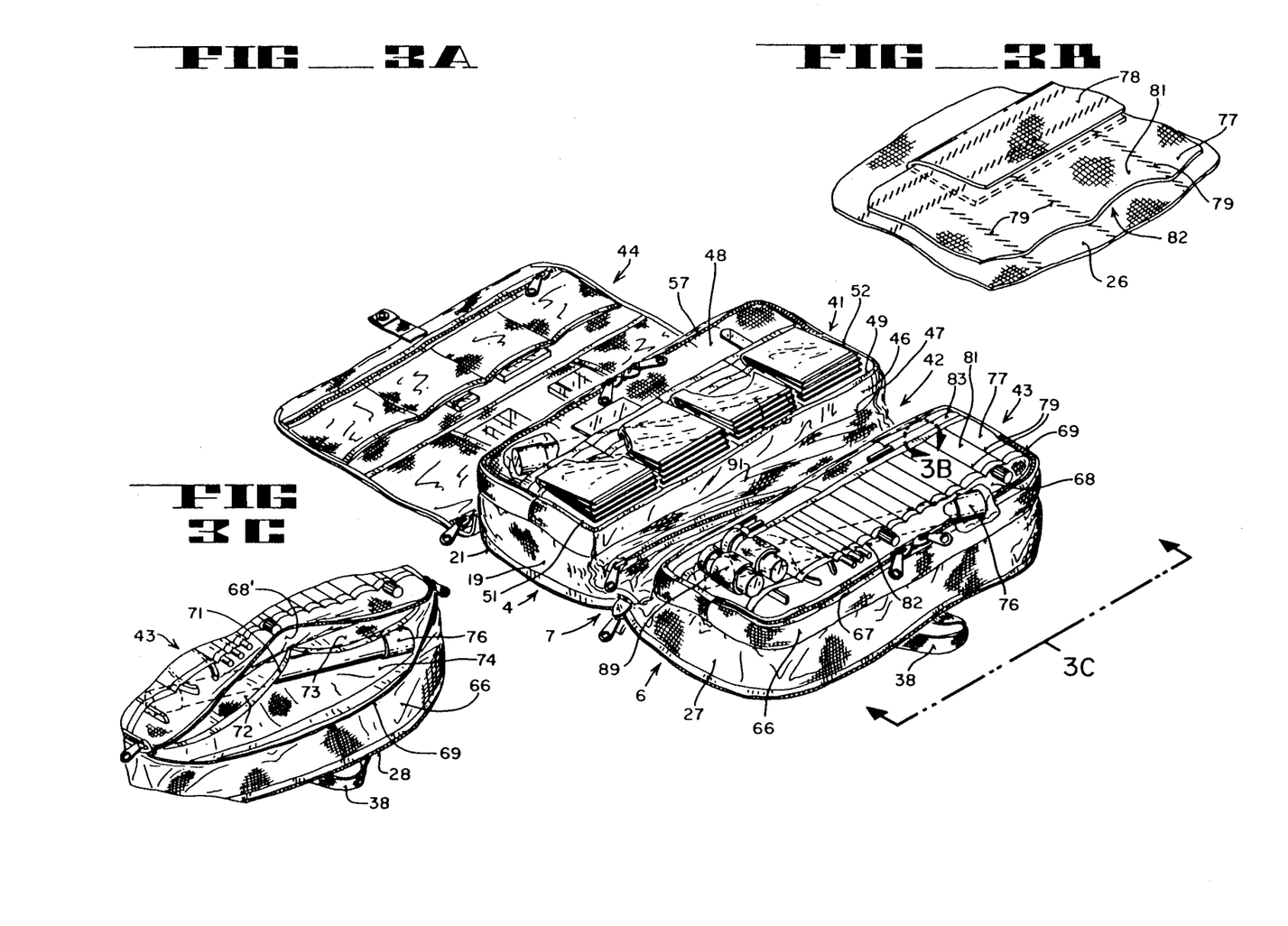
FIG. 3A is a perspective view of my tote bag illustrating the interior arrangement of three of the sections, including the dubbing section or panel that is selectively detachable from the main bag portion.
FIG. 3B is a fragmentary view of a portion of the bag shown at the arrows 3B in FIG. 3A, and illustrating the manner of reinforcement of this portion of the bag.
FIG. 3C is a fragmentary perspective view illustrating a storage pocket for a thread tube or other items within one section of the bag. The view is taken in the direction of the arrows 3C in FIG. 3A.

Referring again to FIGS. 3A, 4 and 6, and specifically the right main receptacle portion 6 of the tote bag, and more particularly the construction of the second auxiliary or tool receptacle 43 there depicted, the second auxiliary or tool receptacle is constructed in much the same way as the "cape" receptacle previously discussed, but when not in use is enclosed within the right main receptacle portion 6 which, as previously discussed, constitutes a shallow receptacle or recess within which the tool receptacle is normally enclosed. When the tool receptacle is vaulted into its raised position as illustrated in FIG. 3A, the tool receptacle lies exposed for easy access by the fly-tyer. Thus, referring to the drawings, the second auxiliary or tool receptacle 43 is formed by a surrounding side-edge wall 66 the lower-edge portion of which is sewn in the same internal seam that forms the union between the right side wall member 26 and the zipper-panel portion 27. The side-edge wall portion 66 continues around so that one long edge portion thereof is sewn in the same internal seam that forms the union between the side wall member 26 and the bottom wall 23 that forms the spine 7. There is thus provided a continuous side-edge wall member generally rectangular in its configuration and providing a shallow recess of approximately two inches in depth. Sewn to the upper edge 67 of this side-edge wall portion along the longitudinal edge thereof that is parallel to and extends above the edge sewn to the bottom wall member 23, is a generally rectangular soft and flexible woven fabric wall member 68 that is sewn also to about one-half of its opposite end-edge portions to the corresponding edge of the side-edge wall portion 66. The remaining corresponding and juxtaposed edge portions of the wall member 68 and side-edge wall portion 66 are provided with a zipper 69 as shown that may be selectively operated to open and close the receptacle pocket thus formed between the top-side member 68 the side-wall member 26 and the side-edge wall 66.

To the inside surface of the top panel 68, shown best in FIG. 3C, there is stitched a generally rectangular sheet 71 of soft and flexible woven fabric sewn at its opposite ends to the top-wall panel 68 and medianly to create two side-by-side pockets 72 and 73 as shown. By opening the zipper 69, there is exposed a relatively large interior cavity 74 within which may be stored items useful in the manufacture or construction of fishing flies, such as an elongated thread tube 76.

Sewn lengthwise over the top surface of the top wall member 68 is a generally rectangular, elongated, soft and flexible woven fabric strip 77, the lateral edges of which are reinforced with binding tape 78 as illustrated, and the opposite ends of the elongated strip being sewn to opposite end portions of the top-wall member 68 in its union with the top edge portion of the side-edge wall member 66. One long edge 79 of the strip 77, including the double layer of binding tape 78, is sewn for its full length with double stitching to the underlying wall member 68 adjacent the spine portion of the tote bag as shown. The opposite long edge of the strip 77 is sewn only to the underlying wall member 68 intermittently by transversely extending lines of stitching 79 to create a multiplicity of transversely slip-extending pockets 81, the open ends 82 of which face the zipper 69. As illustrated, these pockets may be utilized to contain and securely retain many different types of tools used in the construction of fishing flies.

Associated with the edge of the strip 77 that is continuously sewn to the underlying wall member 68, and located adjacent one end of the wall member 68, is a shorter panel 83 that is also sewn to the underlying side-wall member 68 in the space between the elongated binding tape 78 and the union of the top-wall member 68 and the upper edge of side-edge wall member 66 as shown. Here, as illustrated best in FIGS. 3A and 6, the shorter panel 83 is sewn lengthwise medianly of its width by longitudinal stitching 84 to form two longitudinally-extending pockets 86 and 87. As indicated in the drawings, this longitudinally-extending pair of pockets may be replicated at the opposite corner of the top wall 68 where indicated generally by the numeral 88. These four pockets are particularly convenient for long types of tools that do not fit within the pockets 81 that are limited in their depth by the transverse dimension of the strip 77 and the constraints imposed by the location of the zipper 69.

As illustrated in FIGS. 3A and 6, while the second auxiliary or tool receptacle 43 is normally contained within the shallow recess of the main receptacle portion 6 of the tote bag, by turning the zipper panel portion 27 substantially inside out, as it were, the entire tool receptacle 43 is vaulted into a completely exposed condition where access may be readily had to all of the pockets contained in the tool receptacle. When it is desired to close the tote bag, all that is necessary is that the zipper panel portions 19 and 27 be turned right-side-in to its normal configuration to again cause the "cape" receptacle and tool receptacle to again be recessed within the confines of the tote bag.

Referring again to FIGS. 3A and 6, there is shown sewn on the top surface of the strip 77 adjacent one end thereof, two pairs of strips of hook and loop-type material to form selectively detachable means designated generally by the numeral 89 for detachably securing cylindrical objects to the strip 77 and the underlying top-wall panel as shown. As is common knowledge, the hook and loop strips, when pressed together, engage in a manner to prevent disengagement when the strips are pulled longitudinally, but may be selectively detached by stripping one vertically away from the other strip.

The third auxiliary or vise receptacle 42 is disposed between the left main receptacle portion designated generally by the numeral 4 and encompassing the "cape" receptacle 41, and the right main receptacle portion 6 encompassing the tool receptacle 43. The centrally-disposed third auxiliary receptacle is formed on the bottom wall 23 that forms the spine 7, by an overlying or superimposed generally rectangular soft and flexible woven fabric wall member 91 provided with a diagonally extending zipper 92, which when open, gives access to the interior of the centrally disposed third auxiliary receptacle to receive placement of a tying vise and other related accessories (such as a vise clamp and extended-body tools) that are necessary for the support of materials used in the construction of a fishing fly. Preferably, the third auxiliary receptacle 42 is provided with a relatively thick layer of a closed-cell, sponge-like material that overlies the inner surface of the bottom wall 23 so as to reinforce the bottom wall against the weight of the tools contained within the receptacle 42.

The dubbing panel designated generally by the numeral 44 comprises a substantially square sheet or panel 101 of a soft and flexible woven fabric including a mounting portion 102 provided along one edge with fasteners elements 103 that are adapted to detachably engage the complementary fastener elements 104 mounted on the zipper-panel portion 19. The fastener elements may be of the snap-fastener type. It should be noted that as viewed in FIGS. 3A, 4, 5 and 6, it appears that the mounting portion 102 is attached to the outside surface of the tote bag. However, it should be understood that in these views, the zipper panel portion 19 has been turned inside out as previously discussed. Accordingly, the mounting portion 102 of the dubbing panel 44 mounts adjacent the inside surface of the zipper-panel portion 19 rather than the outside surface thereof.

Overlying the mounting section 102 of the dubbing panel 101 is a folded-over section 106 of the panel 101, the fastener elements 103 being positioned adjacent the fold, and the end edges of the strip 106 being bound to the edge of the panel 101 by a strip of binding tape 107. The edge of the folded-over strip 106 remote from and parallel to the fold is provided with a zipper portion 108. The other complementary zipper portion 109 is appropriately sewn to an elongated strip 112 extending from end-to-end of the panel 101 and superimposed thereover and having its end edges sewn to the associated and juxtaposed end edges of the panel 101 and again reinforced with the binding tape 107 as shown.

The strip 112 has superimposed over the opposed ends thereof a pair of pockets 113 and 114, the open ends of which are mutually-facing, and reinforced by binding tape 116. The base of the pocket is sewn to the associated and juxtaposed end of the strip to which it is associated and the underlying panel 101. Along its edge remote from the zipper portion 109, the edge of the strip 112 is sewn by appropriate stitching 117 to the underlying panel 101 to thereby constitute the strip 112 the top portion of an elongated pocket the opening to which is provided by the zippered edges 108 and 109. The pockets 113 and 114, as illustrated, provide access through their open ends, and are useful to retain whatever type of material or instructions it might be expedient to retain in these pockets.

Figure 8:
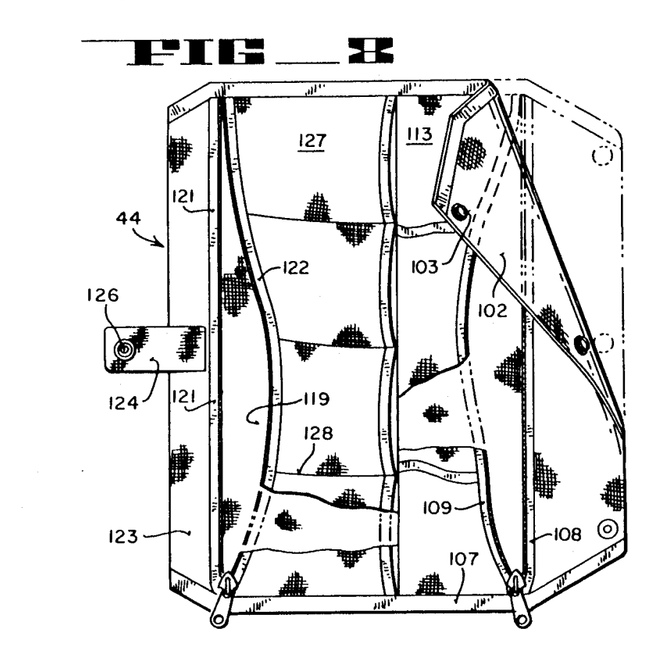
FIG. 8 is a top-plan view of the dubbing section or panel apart from the main portion of the bag, and shown in an extended condition.

The stitching 117 that closes the bottom end of the pocket formed by the strip 112 also closes the bottom end of a strip 118 that overlies and is stitched to the strip 117 and to the underlying panel 101 to form a second elongated pocket 119 having zipper portions 121 and 122 arranged to selectively close the pocket to retain material disposed therewithin, or to permit opening of the pocket to provide access to such material. As illustrated in FIGS. 6 and 8, the zipper portion 121 is sewn to the associated edge of a folded-over portion 123 of the panel 101, and medianly is provided with a woven tab 124 provided with a fastener element 126 adapted to detachably engage the fastener element 104 mounted on the mounting section 102 so that when the dubbing panel 44 is detached from the tote bag, it may individually be folded into the form illustrated in FIG. 9, and the tab 124 fastened to the fastener 104 to retain it in folded condition as illustrated.

To lend greater utility to the dubbing panel, the strip 118 is provided with an overlayed strip 127 bound by stitching to the zipper portion 122. Its opposite end portions are bound to the associated and juxtaposed edge portions of the panel 101 and reinforced by the binding tape 107, and sewn transversely at intervals as indicated at 128 to provide a multiplicity of slip pockets 129 the open ends of which face the center of the panel and are reinforced by binding tape as illustrated.

Figure 2:
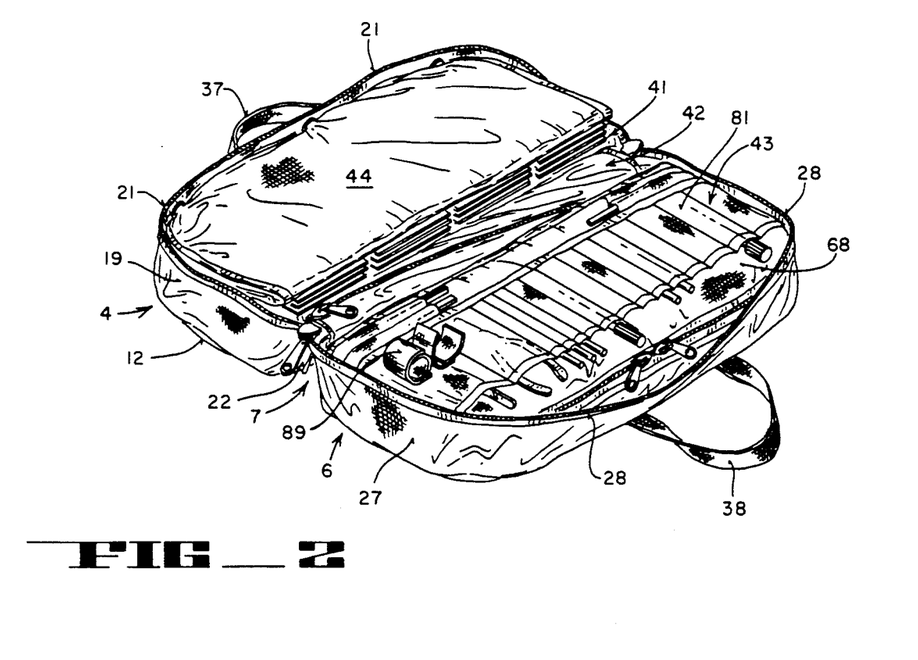
FIG. 2 is a perspective view of my tote bag shown with the perimiter zipper open and two main sections of the tote bag laid out horizontally to expose a portion of the interior of the tote bag.
Figure 4:
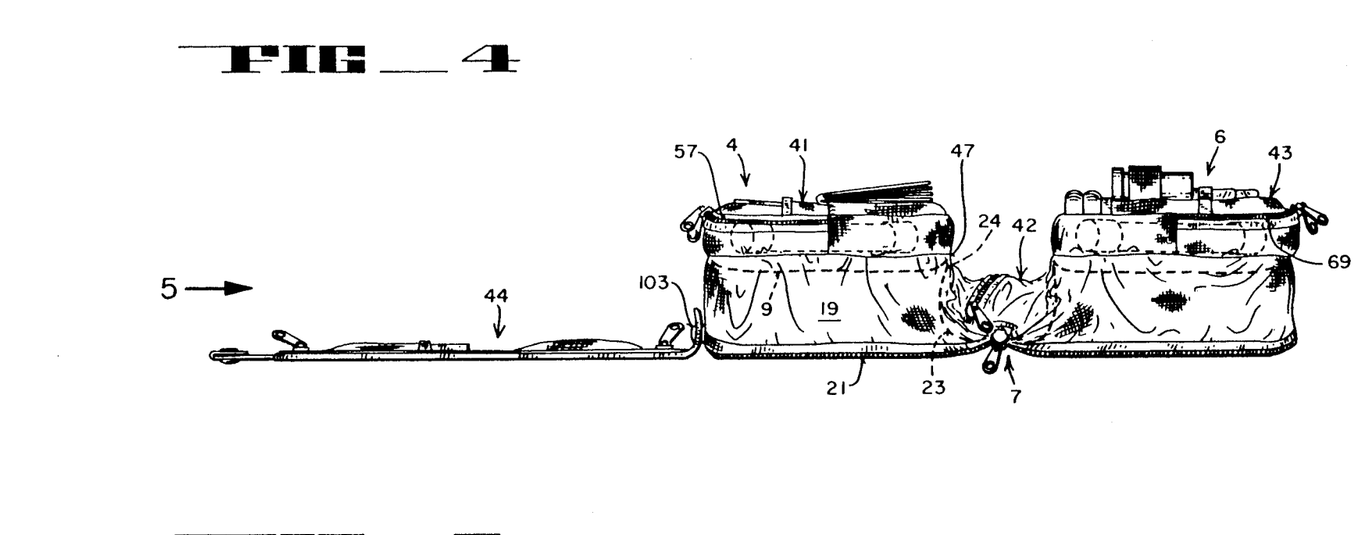
FIG. 4 is a side elevational view of the entire tote bag shown in open condition, with the dubbing section or panel extended, but selectively attached to the main portion of the bag.
Figure 5:
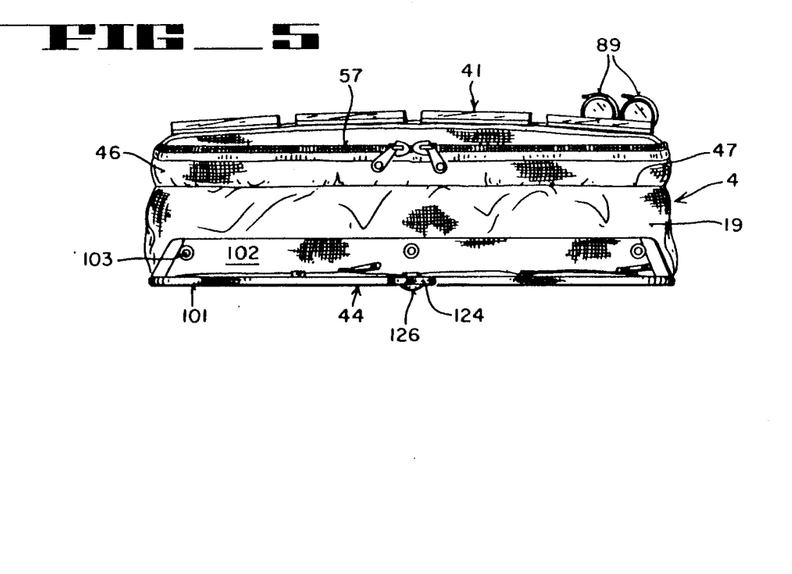
FIG. 5 is an end elevational view of the bag taken in the direction of the arrow 5 in FIG. 4.
Figure 7:
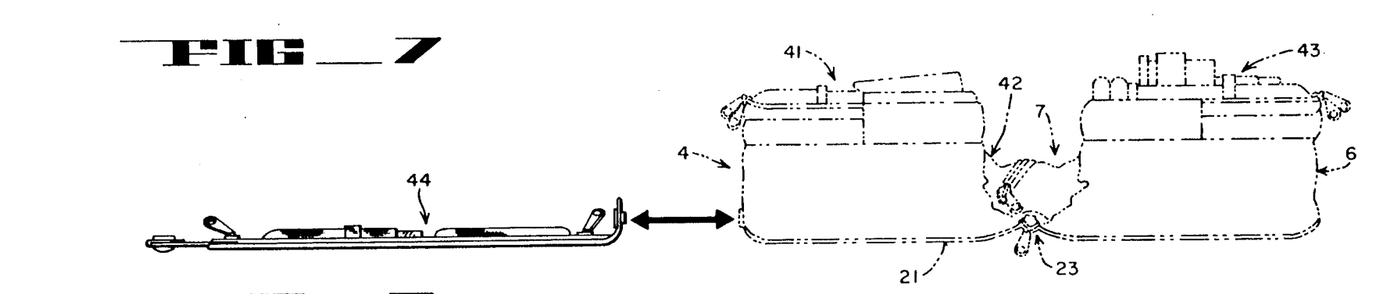
FIG. 7 is a view similar to FIG. 4, but showing the dubbing section or panel selectively detached from the main bag portion.
Figure 9:
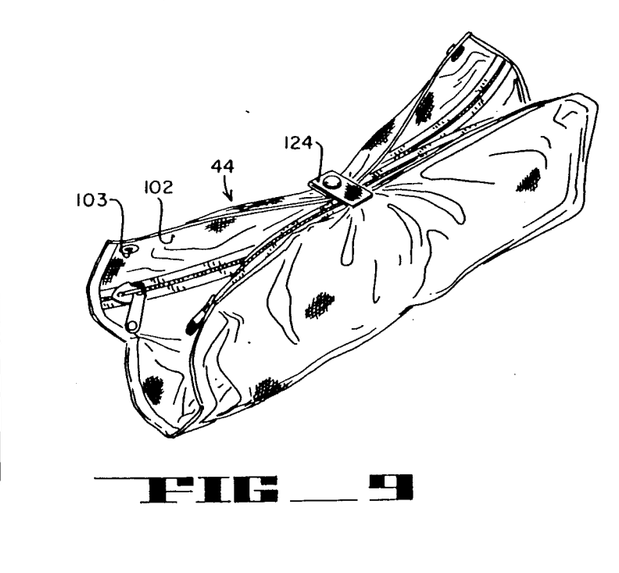
FIG. 9 is a perspective view of the dubbing section or panel shown folded and selectively fastened for purposes of storing contents in a secured manner.

It will thus be seen that the dubbing panel or section 44 may be mounted within the receptacle formed by the main receptacle portion 4 of the tote bag as illustrated in FIG. 2, and may be left attached to the tote bag as illustrated in FIGS. 3A, 4 and 6, or it may be detached as illustrated in FIGS. 7, 8 and 9 and utilized as an individual carrier for the dubbing materials stored in this component of the tote bag.

Having thus described the invention, what is believed to be a new and novel and sought to be protected by letters patent of the United States is as defined in the claims that follow.

I claim:

1. A soft-pack tote bag for fly-tying materials, tools and equipment, comprising:
   a) a main receptacle fabricated from flexible woven fabric and including a pair of laterally-spaced, generally rectangular side-wall members joined along corresponding long edge portions to a bottom-wall member and along their end edge portions to corresponding end-edge portions of a zipper panel including a zipper bisecting the long dimension of the zipper panel and extending between opposite end-edge portions of the bottom-wall member;
   b) a first auxiliary receptacle formed from flexible woven fabric mounted within said main receptacle and adapted to provide a first receptacle within which fly-tying materials and equipment may be enclosed;
   c) a second auxiliary receptacle formed from flexible woven fabric mounted within said main receptacle and adapted to provide a second receptacle within which fly-tying materials and equipment may be enclosed;
   d) a third auxiliary receptacle formed from flexible woven fabric mounted within said main receptacle between said first and second auxiliary receptacles; and
   e) a dubbing panel detachably secured to the interior of said main receptacle and adapted to be disposed between said first and second auxiliary receptacles when said tote bag is closed and selectively extendable to project out of said main receptacle when said tote bag is open.

2. The tote bag according to claim 1, wherein said first auxiliary receptacle constitutes a pocket, and a zipper is provided selectively operable to open or close the pocket.

3. The tote bag according to claim 1, wherein said second auxiliary receptacle constitutes a pocket, and a zipper is provided selectively operable to open or close the pocket.

4. The tote bag according to claim 1, wherein said third auxiliary receptacle constitutes a pocket, and a zipper is provided selectively operable to open or close the pocket.

5. The tote bag according to claim 1, wherein said dubbing panel constitutes a flat base sheet of flexible woven fabric having a mounting section on one end thereof, and detachable fastener means are provided on said mounting section selectively engageable with the interior of said main receptacle.

6. The tote bag according to claim 1, wherein said first auxiliary receptacle includes a top-wall panel of flexible woven fabric, and a plurality of slip pockets are provided on said top-wall panel for receiving material for constructing flies.

7. The tote bag according to claim 1, wherein said first auxiliary receptacle includes a side-edge wall one long edge of which is sewn to the perimeter of one of said side-wall members, a flexible woven fabric top-wall panel sewn to the opposite long edge of the side-edge wall, and a zipper bisecting one long side of said side-edge wall and selectively operable to open or close an opening in said side-edge wall giving access to the interior of said first auxiliary receptacle.

8. The tote bag according to claim 1, wherein said second auxiliary receptacle includes a side-edge wall member one edge portion of which is sewn to the perimeter of one of said side-wall members, a flexible woven fabric top-wall panel sewn to the opposite edge portion of the side-wall member, and a zipper bisecting at least one long side of said side-edge wall to selectively open or close an opening therein giving access to the interior of said second auxiliary receptacle.

9. The tote bag according to claim 1, wherein said third auxiliary receptacle includes a flexible woven fabric bottom-wall member, a cover panel of flexible woven fabric superimposed over the bottom-wall member, and a zipper mounted in said cover panel extending diagonally thereacross and selectively operable to open or close an opening in said cover panel to give access to the interior of the of the third auxiliary receptacle.

10. The tote bag according to claim 5, wherein said dubbing panel includes a pair of juxtaposed elongated woven fabric strips sewn at opposite ends to said flat base sheet and each sewn along one long edge to said flat base sheet to form a pair of main pockets having open ends facing in opposite directions, and zipper means operatively associated with the open end of each main pocket and selectively operable to open or close the pocket.

11. The tote bag according to claim 10, wherein at least one patch pocket is mounted on one of said elongated woven fabric strips that forms a main pocket, said patch pocket having an open end facing in a direction perpendicular to the direction in which the open end of the main pocket faces.

12. The tote bag according to claim 10, wherein a third elongated woven fabric strip is superimposed over one of said first-mentioned pair of juxtaposed elongated woven fabric strips, said third elongated strip having its end portions sewn to said flat base sheet and one long edge sewn to the underlying one of said pair of strips, and stitching securing said third strip at spaced intervals to the underlying strip of said pair of strips to form a plurality of juxtaposed slip pockets opening in the direction of said mounting section.

13. The tote bag according to claim 10, wherein tab means are provided on the edge portion of the base sheet opposite said mounting section, and a fastener element on said tab means selectively engageable with a complementary fastener element on said mounting portion.

14. The tote bag according to claim 7, wherein said side-edge wall of said first auxiliary receptacle on which said zipper is mounted faces said zipper panel of said main receptacle when the tote bag is closed.

15. The tote bag according to claim 14, wherein said side-edge wall extends across the end portions of said top wall panel, and said zipper extends approximately midway of said end-edge wall portion of the side-edge wall.

16. The tote bag according to claim 8, wherein said side-edge wall of said second auxiliary receptacle on which said zipper is mounted faces said zipper panel of said main receptacle when said tote bag is closed.

17. The tote bag according to claim 16, wherein a plurality of slip pockets are provided on said top-wall panel having openings facing said zipper panel of said main receptacle when the tote bag is closed.

18. The tote bag according to claim 16, wherein a plurality of slip pockets are provided on said top-wall panel having openings facing in a direction parallel to the long dimension of said top-wall panel.

19. The tote bag according to claim 8, wherein a pair of side-by-side pockets are provided associated with the interior surface of said top-wall panel, said pair of side-by-side pockets opening in the direction of said zipper.

20. The tote bag according to claim 8, wherein a pair of hook and loop fabric strips are mounted on said top-wall panel and manipulable to wrap about and secure a cylindrical body such as a tool or container.

* * * * *